United States Patent
Moghaddam

(10) Patent No.: US 7,986,820 B2
(45) Date of Patent: Jul. 26, 2011

(54) METHOD FOR COMPARING FEATURES EXTRACTED FROM IMAGES OF FINGERPRINTS

(75) Inventor: Baback Moghaddam, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 3113 days.

(21) Appl. No.: 10/087,409

(22) Filed: Oct. 19, 2001

(65) Prior Publication Data

US 2003/0076985 A1    Apr. 24, 2003

(51) Int. Cl.
*G06K 9/00* (2006.01)
*G06K 9/46* (2006.01)
*G06K 9/74* (2006.01)
*G08K 9/40* (2006.01)

(52) U.S. Cl. ........ 382/124; 382/125; 382/190; 382/254; 356/71

(58) Field of Classification Search .................. 382/115, 382/124, 125, 173, 181, 190, 192, 266, 254, 382/272, 270, 289, 276, 286, 195, 201, 228, 382/206, 274–275, 296, 295, 224, 260, 301, 382/395; 340/5.82, 5.83; 356/71; 705/53

See application file for complete search history.

(56) References Cited

U.S. PATENT DOCUMENTS

| | | | | |
|---|---|---|---|---|
| 4,135,147 A * | 1/1979 | Riganati et al. | ............... | 382/125 |
| 5,572,597 A * | 11/1996 | Chang et al. | ................. | 382/125 |
| 5,659,626 A | 8/1997 | Ort et al. | ....................... | 382/125 |
| 6,067,369 A | 5/2000 | Kamel | .......................... | 382/125 |
| 6,173,068 B1 * | 1/2001 | Prokoski | ....................... | 382/115 |
| 6,229,922 B1 * | 5/2001 | Sasakawa et al. | ............. | 382/209 |
| 6,263,091 B1 | 7/2001 | Jain et al. | ...................... | 382/125 |
| 6,487,321 B1 * | 11/2002 | Edgar et al. | .................... | 382/260 |
| 6,597,802 B1 * | 7/2003 | Bolle et al. | ..................... | 382/124 |
| 6,763,127 B1 * | 7/2004 | Lin et al. | ....................... | 382/125 |
| 6,785,419 B1 * | 8/2004 | Jojic et al. | ..................... | 382/197 |

OTHER PUBLICATIONS

Sasakawa et al., in *"Personal Verification System with High Tolerance of Poor Quality Images,"* SPIE vol. 1386, Machine Vision Systems, pp. 265-272, 1990.

* cited by examiner

*Primary Examiner* — Sheela C Chawan
(74) *Attorney, Agent, or Firm* — Dirk Brinkman; Gene Vinokur

(57) ABSTRACT

Features are extracted from a test and reference image to generate a test and reference record. Each feature has a location, and orientation, and furthermore, the features of the reference records also have associated weights. The features of the test record are approximately aligned with the features of the reference record. Then, differences between the locations and orientations of the features of the reference record and the features of the test record are measured, and the weights of all features of the reference record that are less than a predetermined difference when compared with the features of the test record are summed to determine a similarity score that the test record matches the reference record.

15 Claims, 4 Drawing Sheets

METHOD FOR COMPARING FEATURES EXTRACTED FROM IMAGES OF FINGERPRINTS

FIELD OF THE INVENTION

The present invention relates generally to comparing features extracted from images, and more particularly to comparing unknown fingerprints with known fingerprints.

BACKGROUND OF THE INVENTION

Images of fingerprints are routinely used to identity individuals. Because each person's fingerprints are unique, images of unknown fingerprints can be compared with images of known fingerprints stored in a database. For example, the database of fingerprints in the FBI archives includes over 30 million ten-print "cards." When a matching set of fingerprints is found in the database, the identity of the person can be verified. Standard image formats have been adopted for recording and storing images of a person's fingerprints along with additional information such as: names, alias names, birth date, height, weight, hair color, eye color, race, and so forth.

Prior art fingerprint verification systems typically include techniques for locating, classifying, and identifying key features of fingerprints such as pattern type, ridge features and direction. Ridge features are defined by bifurcations and endings of ridge flows on a person's fingers. These minutiae include cores, deltas, whorls, loops, arches, tented arches, and the like. The minutiae data can include (x, y) coordinates of their locations and degree of orientations (q).

The well known Henry system is the predominant manual system used by law enforcement agencies for fingerprint identification. However, the Henry system uses a relatively small number of classifying characteristics. Hence the total number of identifier codes is too small to uniquely account for the millions of fingerprints in a comprehensive database.

Generally, three types of automated comparison methods are used for searching a fingerprint database. The first method uses a ten-print-to-ten-print comparison where each finger and its orientation is known. There, the set of prints is complete, and the quality of the images is good. The result of the first method is usually conclusive. The second method uses a latent-to-ten-print comparison. The latent print can be "lifted" from some arbitrary surface through a variety of known techniques. In contrast with the ten-print method, latent prints are usually partial and of poor quality. Often, the finger numbers and their orientations are also unknown. The third method uses a latent-to-latent comparison to determine if two separately obtained prints belong to the same person, even though the exact identity of the person may be unknown.

Generally, automated comparison is performed by first aligning an unknown "test" print with a known or "reference" print. Then, the relative spatial and angular position of comparable minutiae in the two prints are superimposed, evaluated and scored according to the number of minutiae that are common to the two prints. The method completes when the unknown print has been compared with all closely matching known prints. A high score indicated a larger number of common minutiae and a probable match. Typically, each pair of matching minutiae increases the score by one. Some typical prior matching methods are described in National Bureau of Standards (NBS) Technical Notes 538 and 878, and NBS Special Publication 500-89.

Prior art fingerprint comparison systems only work well with uniform, high quality images of a ten-print set. However, images of latent prints are often partial and low contrast, making the systems unreliable and inconsistent. In addition, fingerprint artifacts such as cuts, scrapes, abrasions, and scars can lead to "false" minutiae, such as breaks, islands, short branches, lakes, and joins. False minutiae cause identification failures and necessitate operator intervention, which increases cost and reduces throughput.

Sasakawa et al., in "*Personal Verification System with High Tolerance of Poor Quality Images*," SPIE Vol. 1386, Machine Vision Systems, pp. 265-272, 1990. describe a fingerprint verification system (FVS) that uses image enhancement techniques, such as a directional spatial filter and local thresholding, to extract minutiae data. They use both coarse and fine matching for minutiae data, see also, U.S. Pat. No. 6,229,922 "Method and Apparatus for Comparing Incoming Data with Registered Data" issued to Sasakawa et al. on May 8, 2001. Their similarity score is based on a normalized integer count of the number of matching minutiae. Their method scores all matching minutiae equally. That can lead to false acceptances and false rejections, particularly when similar minutiae are located near each other.

Therefore, there is a need for a fingerprint comparison method that can better discriminate features in images.

SUMMARY OF THE INVENTION

According to the invented method, features are extracted from a test and reference image to generate a test and reference record. In one application of the invention, the images are of fingerprints, and the features are fingerprint minutiae. The images can be enhanced before feature extraction. A large number of reference records can be stored in a database for fingerprint identification. In this case, the test record is compared with each of the reference records.

Each feature has a location, and orientation, and furthermore, the features of the reference records also have associated weights, which are precomputed. First, the features of the test record are approximately aligned with the features of the reference record. The alignment can be a rigid transformation using global XY translation, and rotation.

Then, differences between the locations and orientations of the features of the reference record and the features of the test record are measured. The weights of all features of the reference record that are less than a predetermined difference when compared with the features of the test record are summed to determine a similarity score that the test record matches the reference record.

In one aspect of the invention, the features are represented using a probabilistic density function and the transformation only uses global translation to approximately align the records.

DETAILED DESCRIPTION OF THE PREFERRED EMBODIMENT

Method Overview and Data Structures

Figure 1:
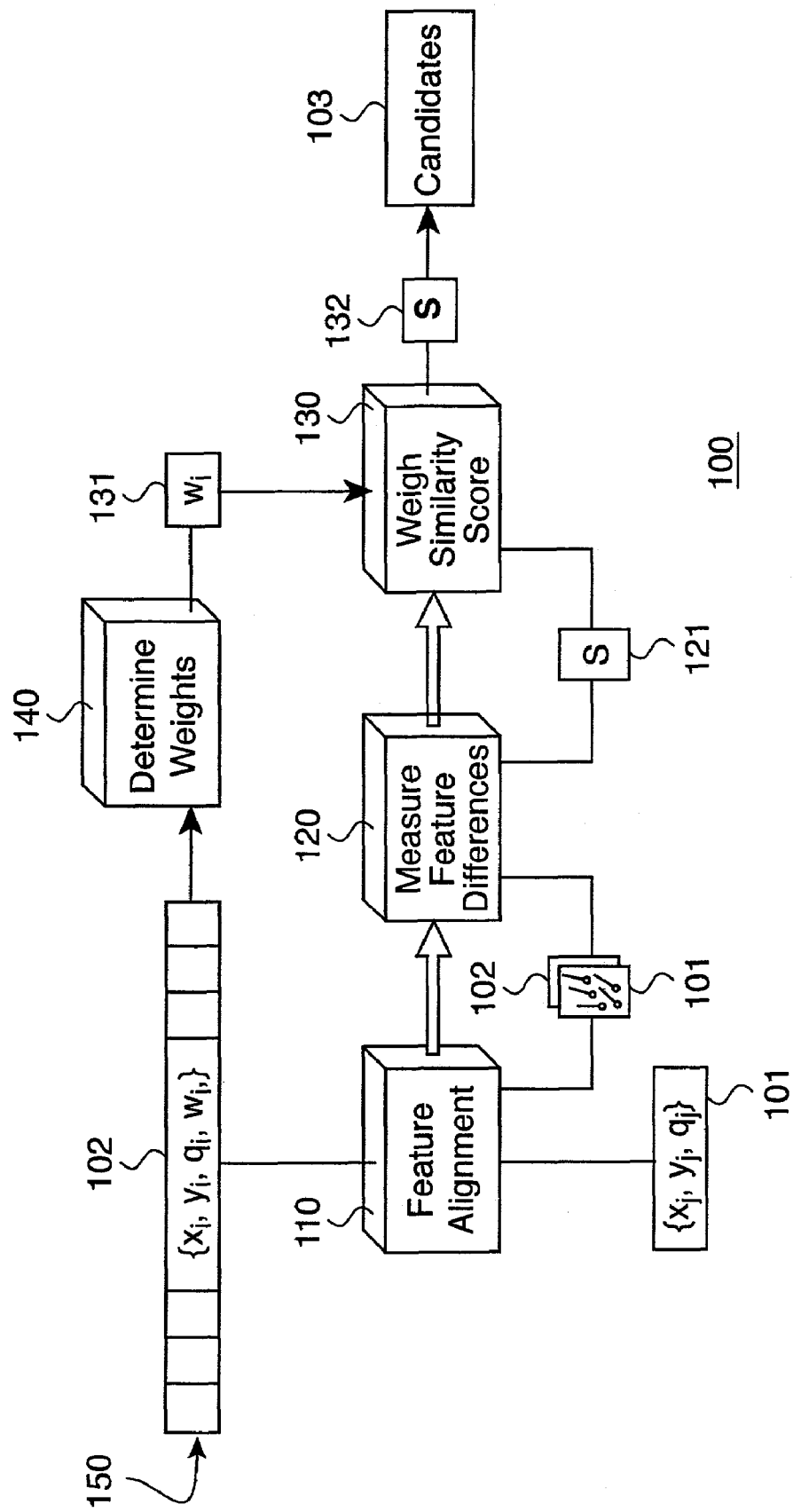
FIG. 1 is a block diagram of a method for comparing image features according to the invention.

FIG. 1 shows a method 100 for comparing features of a test record 101 with reference records 102 stored in a database 150. More particularly, the test record 101 includes minutiae data of an unknown fingerprint, and the reference records 102 include minutiae data of known fingerprints.

In a practical application, the purpose of the method 100 is to determine to what extent the unknown fingerprint is similar to any of the known fingerprints. As shown in FIG. 1, the method 100 according to the invention includes three basic steps, feature alignment 110, difference measuring 120, and weighting 130 to produce a list 103 of scored candidate reference records that most likely match the test record 101. The invention also determines 140 weights 131 for the features of the reference records in a preprocessing step.

Figure 2:
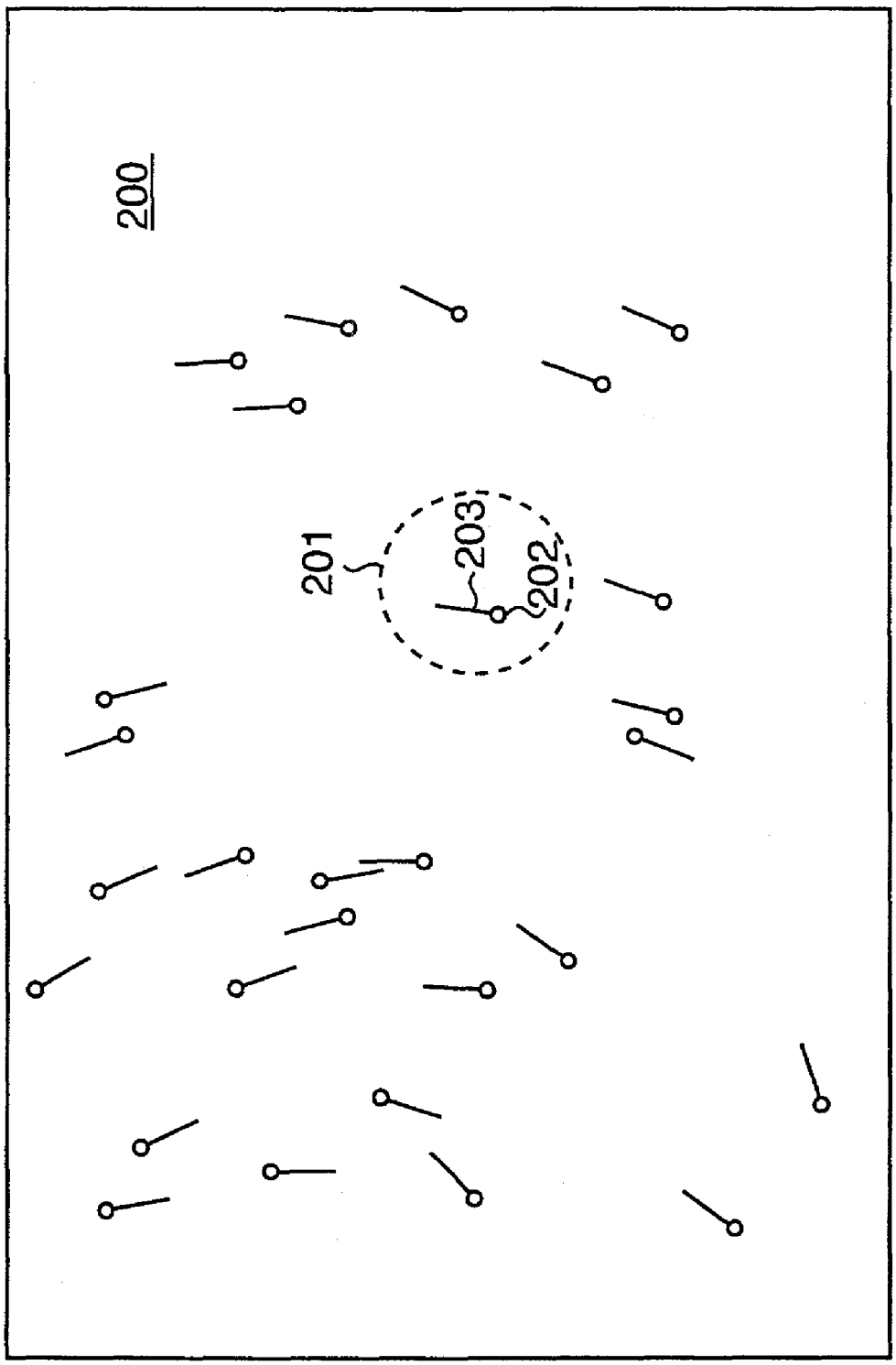
FIG. 2 is a diagram of extracted features showing their locations and orientations.

As shown in FIG. 2, the test record (T) 101 represents the features (minutiae) 200 of the unknown fingerprint as M vectors $$\{x_j, y_j, q_j\}_{j=1}^{M}.$$

For example, the jth feature 201 has coordinates x and y 202 of its location, and a direction q 203 of its orientation, where M is the number of extracted features in the record, twenty-nine in this example. Similarly, the features of each reference record (R) 102 stored in the database 150 is represented by N vectors $$\{x_i, y_i, q_i\}_{j=1}^{N}.$$

It should be noted that the number of features in the test and reference records do not need to be identical.

As described below in greater detail, the features of the reference records have precomputed associated weights, and all features can be represented by a probabilistic density model.

The features 200 can be extracted from an image of an actual fingerprint, or a latent print using conventional techniques, for example, see Sasakawa et al., in "*Personal Verification System with High Tolerance of Poor Quality Images,*" SPIE Vol. 1386, Machine Vision Systems, pp. 265-272, 1990, and U.S. Pat. No. 6,229,922 "Method and Apparatus for Comparing Incoming Data with Registered Data" issued to Sasakawa et al. on May 8, 2001, both incorporated herein by reference.

Method Operation

During operation of the method 100, the test record 101 is compared with each of the reference records 102 to produce the list 103 of likely candidate reference records. The test record is first aligned 110 with each reference record. The alignment is a rigid transformation that can include global XY translation and rotation. Because fingerprint images are generally standard sizes, scaling is usually not necessary.

The alignment 110 can use the Sasakawa ridge-direction displacement (dX, dY), referenced above, to bring the (x, y) components of the features of the test record 101 into approximate alignment with the features of each reference record 102.

Then, a similarity score S of the M features in the test record T matching any of the features in the reference record R is determined by the total average:

$$S(T, R) = \frac{2}{N + M} \text{ (\# of matches)} w,$$

which when expanded in terms of R yields $$S(T, F) = \frac{2}{(N + M)} \sum_{j=1}^{M} \sum_{i=1}^{N} w_i f(x_j - x_i) f(y_j - y_i) f_q(q_j - q_i),$$

where w is the weight, and $f$ is a function that measures the difference between the x, y, and q components of the test and reference features. The function $f(.)$ can be a discrete step function with values $\{0,1\}$ indicating either no match or a match, or a continuous smooth function in the range [0.1] based on a probability of matching.

If all of the differences for a particular pair of features are less than predetermined thresholds, the features are considered matching, for example, $|x_j - x_i| \leq T_x$, and $|y_j - y_i|$ and $\leq T_Y$, $|q_j - q_i| \leq T_Q$. If the number of matching features is large, e.g., the similarity score $S \geq T_{MAX}$, the test record likely matches the reference record. It should be noted, that the search space for matching pairs of features can be restricted to only those pairs of features that are approximately aligned according to their x, y, and q values.

Relevance Weights

In order to improve the discrimination, an set of relevance weights $w_i$ 131 is provided for each reference record 102. The weights in a particular set, unlike the prior art, are not necessarily equal. This is based on the assumption that not all features should count equally when contributing to the similarity score.

Figure 3B:
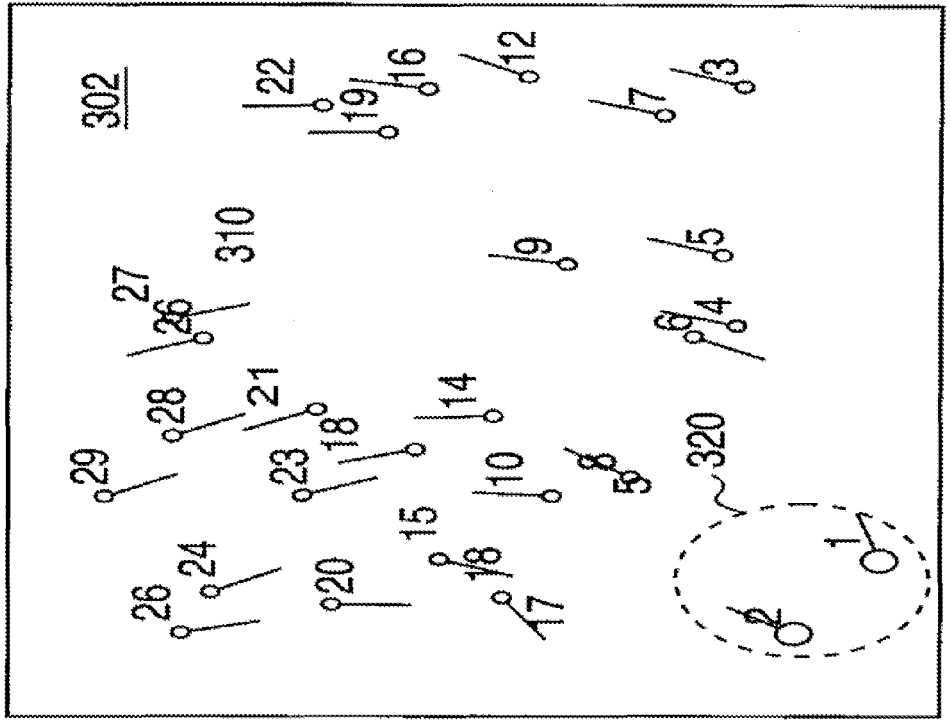
FIG. 3a-b are diagrams of aligned features.
Figure 3A:
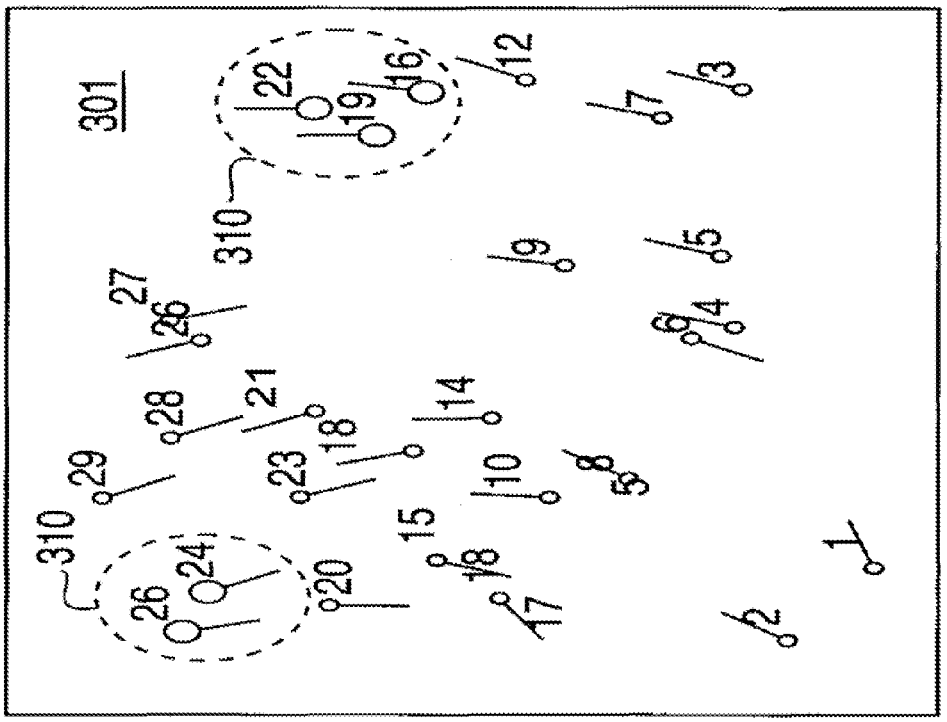

To illustrate this notion, consider the features 1-29 shown in FIG. 3a and FIG. 3b. In FIG. 3a, five acceptable matches (16, 19, 22, 24, 26) from a test record 301 are shown with open circles, all other features are indicated by closed circles. Similarly, FIG. 3b shows a case where there are also exactly five matches (1, 2, 4, 6, 21), but now to different features in a reference record 302. The question is: which of these two matches is more reliable or significant, given that they both have the identical similarity score value of five.

The matches in FIG. 3a are from tightly clustered regions 310 of features which have similar orientations. This means that matches in these regions have "support" from several neighboring features, all of which can contribute their share to the similarity score because they all partially "explain" the observed data in the test record.

On the other hand, in FIG. 3b, matches of features 1 and 2 are relatively "isolated" region 320 where the chance of an accidental alignment is less. Likewise a match to feature 6 is less likely to be due to chance since its nearest neighbor feature 4 has the complete opposite orientation. Similarly, feature 21 is surrounded by opposite orientation features, and is hence also "isolated."

Therefore, one can posit that unique or "isolated" pairs of features are much harder to match, and whenever an acceptable match is found for a pair of isolated features, the similarity score should count more than when a match which can be "explained" by multiple surrounding features with partial overlap. Consequently, the invention makes a feature weight $w_i$ proportional to its uniqueness or distance with respect to its nearest neighboring features.

Therefore, the invention identifies a local neighborhood of the k nearest neighbor features, and the set the weight proportional to a function of these k distances:

$$w_i = N \frac{D(d_i^1, d_i^2, \ldots, d_i^k)}{\sum_{j=1}^{N} D(d_j^1, d_j^2, \ldots, d_j^k)}$$

where $d_i^n$ is the nth distance of feature i. Note, that these weights are normalized to sum to N.

Any number of distance functions D can be used to measure the distance from a particular feature to its neighboring features including the arithmetic mean $$D_0(d^1, d^2, \ldots, d^k) = \frac{1}{k}\sum_{n=1}^{k} d^n,$$

the geometric mean $$D_1(d^1, d^2, \ldots, d^k) = \left[\prod_{n=1}^{k} d^n\right]^{1/k},$$

and the maximum $D^2$ which is simply $d^k$.

In all three cases, the distances are determined for the x, y, and q components of each feature in each reference record to derive the corresponding sets of weights $w_i$ 131. The sets of weights need only be determined 140 once for each reference record, perhaps in an off-line preprocessing step. For completeness, the reference record (R) 102 could be represented by the vector $$\{x_i, y_i, q_l, w_i\}_{i=1}^{N}.$$

The weights $w_i$ in a particular reference record can be normalized to sum to one. Then, when there is a match between two features, the weighted similarity score S 132 is incremented by the corresponding weight, instead of by one as in the prior art.

Probabilistic Feature Matching

As stated above, the alignment step 110 performs translational and rotational rigid transformations. However, by using a probabilistic model, as described in greater detail below, the alignment can be less precise, and the rotational transformation step can be eliminated, decreasing the number of computations.

According to a kernel density model of the invention, the reference records are built using radial Gaussian functions:

$$P_R(x, y, q) = \sum_{i=1}^{N} w_i f(x - x_i; \sigma_x^2) f(y - y_i; \sigma_y^2) f_q(q - q_i; \sigma_q^2)$$

where $$\sum_i^N w_i = N.$$

The function $f(0; \sigma^2)$ is a standard zero-mean Gaussian with a variance $\sigma^2$, e.g.:

$$f(x; \sigma^2) = e^{-x^2/2\sigma^2}.$$

The function $f_q(0; \sigma^2)$ is also Gaussian, except that in subtracting $q_i$ from q, the boundary conditions at 0° and 360° are handled properly, e.g., 5° and 355° are considered to be ten degrees apart.

The similarity score S is now determined by:

$$S(T, R) = \frac{2}{N + M} \sum_{j=1}^{M} P_R(x_j, y_j, q_j),$$

which when expanded in terms of $P_R$ yields $$S(T, F) = \frac{2}{(N+M)} \sum_{j=1}^{M} \sum_{i=1}^{N} w_i f(x_j - x_i; \sigma_x^2) f(y_j - y_i; \sigma_y^2) f_q(q_j - q_i; \sigma_q^2),$$

and the distances are determined in a manner similar to log-probabilities, in terms of the individual σ terms for (x, y, q). In other words, the mutual distance between features i and j are given by a normalized (balanced) $L_p$ norm $$d_{ij} = \left[\frac{(x_i - x_j)^p}{\sigma_{w_x}^p} + \frac{(y_i - xy_j)^p}{\sigma_{w_y}^p} + \frac{(q_i - q_j)^p}{\sigma_{w_q}^p}\right]^{1/P},$$

where for a Euclidean metric, p=2.

Note that in subtracting orientations q, the boundary condition and "wrap-around" at 0 and 360 degrees must again be properly handled as with determining the modified Gaussian $f_q$ in $P_R$. The variances $\sigma_w$ in (x, y, q) are needed to account for independent weighting of distances, and also to account for the range differences between (x, y) and q.

Figure 4B:
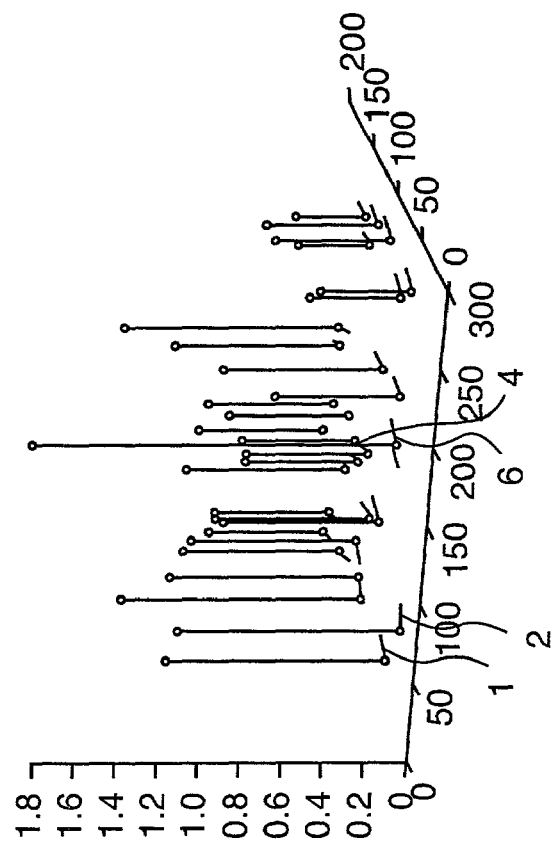
FIG. 4a-b are diagrams of weighted features according to the invention.
Figure 4A:
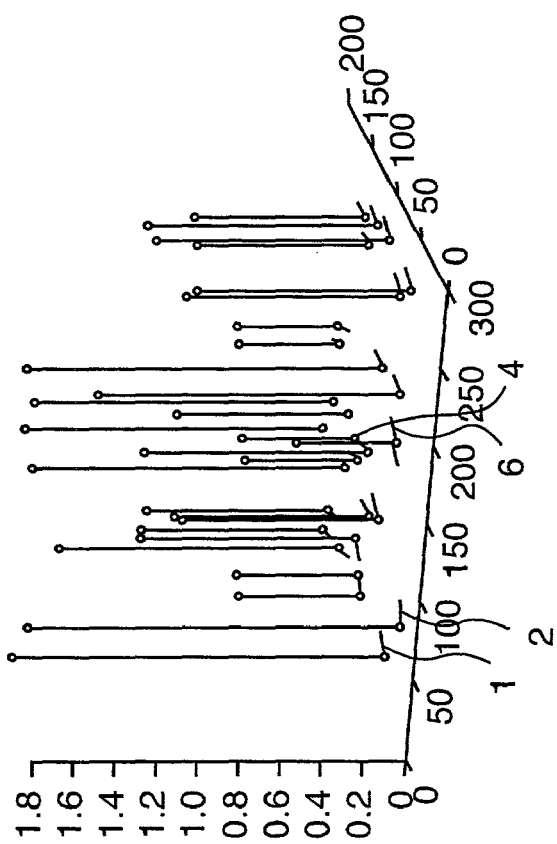

FIGS. 4*a-b* show the "relevance" weighting under two different conditions or "relevance" assumptions. FIG. 4*a* shows these weights as vertical lines for a case where (x, y) are equally weighted but $\sigma_{w_q}$ is intentionally set large to disable the effect of orientation similarity. This results in a set of weights which only take into account the spatial geometry of the features, i.e., the (x, y) k neighborhood structure. For example, in FIG. 4*a* features 1 and 2 have the largest weights due to their spatial isolation and features 4 and 6 have relatively low weights given their proximity. In contrast, FIG. 4*b* shows a more balanced set of $\sigma_w$ values which incorporate orientation differences as well, refer back to FIGS. 3*a-b* to see this better.

Notice that in FIG. 4*b* features 1 and 2 no longer have the maximal weights, instead feature 6 has the largest weight due to the fact that there are no minutiae of similar orientation in its proximity. Compare this with the XY-only weighting scheme in FIG. 4*a* in which both features 6 and 4 are de-emphasized simply because of their XY proximity. The relative $\sigma_w$ values that optimize performance are a compromise with an intermediate value of $\sigma_{w_q}$. Appropriate values of all the above parameters which optimized the performance of the method according to the invention are given below.

Tuning and Results

For best performance, several parameters can be "fine-tuned" for a specific application. Foremost are the kernel parameters used in the expansion $P_R$, mainly the variances of x, y, q and w. Then the best-performing kernel parameters for the Gaussian mixture, in terms of error rates, and best trade-off between spatial (XY-only) weighting, and combined spatial-orientation weights, can be selected.

The probabilistic matching technique, with only global XY translation, can reduce the false acceptance error rate by up to a factor of six, for the same false rejection rate, with significantly less computation because the costly fine-alignment search as done by the prior art Sasakawa method is eliminated.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for comparing features of a test record with features of a reference record, each feature having a location and orientation, comprising;
    determining a weight for each feature of the reference record;
    aligning the features of the test record with the features of the reference record;
    measuring differences between the locations and orientations of the features of the reference record and the features of the test record; and
    summing the weights of all features of the reference record that are less than a predetermined difference when compared with the features of the test record to determine a similarity score that the test record matches the reference record.

2. The method of claim 1 further comprising:
    comparing the features of the test record with a plurality of reference records to determine a plurality of similarity scores; and
    selecting a particular reference record as a candidate reference record if the corresponding similarity score is greater than a maximum threshold.

3. The method of claim 1 further comprising:
    extracting the features from images of fingerprints.

4. The method of claim 1 wherein the alignment is a rigid transformation including global translation and rotation.

5. The method of claim 1 wherein the alignment is a rigid transformation including only global translation to approximately align the features of the test record with the features of the reference record.

6. The method of claim 5 wherein a probability of matching features is represented by a zero-mean Gaussian function $f(0; \sigma^2)$, where $\sigma^2$ is a variance of the function.

7. The method of claim 6 wherein the similarity score S for a test record T of M features and a reference record R of N features is determined by $$S(T, R) = \frac{2}{(N+M)} \sum_{j=1}^{M} \sum_{i=1}^{N} w_i f(x_j - x_i; \sigma_x^2) f(y_j - y_i; \sigma_y^2) f_q(q_j - q_i; \sigma_q^2),$$

where x and y represent the location of the feature, q the orientation of the feature, w the weight of the feature, and f is a difference function.

8. The method of claim 1 further comprising:
    measuring differences only between pairs of features that are approximately aligned.

9. The method of claim 1 wherein the determining step further comprises;
    identifying, for each feature in the reference record, a local neighborhood of features; and
    setting the weight of each feature proportional to a function of distance between each feature and the local neighborhood of features.

10. The method of claim 9 wherein the function for weight $w_i$ and k features in the local neighborhood is $$N \frac{D(d_i^1, d_i^2, \ldots, d_i^k)}{\sum_{j=1}^{N} D(d_j^1, d_j^2, \ldots, d_j^k)}.$$

where $d_i^n$ is an nth distance of feature i, N is a number of features and D is a distance function.

11. The method of claim 9 wherein the distance function is an arithmetic mean.

12. The method claim 9 wherein the distance function is a geometric mean.

13. The method of claim 9 wherein the distance function is maximum distance.

14. The method of claim 1 wherein the sum of the weights of the features of the reference record is normalized to one.

15. A method for comparing features of a test record with features of a reference record, each feature having a location and orientation, comprising;
    determining a weight for each feature of the reference record, the determining further comprising:
    identifying, for each feature in the reference record, a local neighborhood of features; and
    setting the weight of each feature proportional to a function of distances between each feature and the local neighborhood of features;
    aligning the features of the test record with the features of the reference record;
    measuring differences between the locations and orientations of the features of the reference record and the features of the test record; and
    summing the weights of all features of the reference record that are less than a predetermined difference when compared with the features of the test record to determine a similarity score that the test record matches the reference record, and wherein the similarity score S for a test record T of M features and a reference record R of N features is determined by $$S(T, R) = \frac{2}{(N+M)} \sum_{j=1}^{M} \sum_{i=1}^{N} w_i f(x_j - x_i; \sigma_x^2) f(y_j - y_i; \sigma_y^2) f_q(q_j - q_i; \sigma_q^2),$$

where x and y represent the location of the feature, q the orientation of the feature, w the weight of the feature, and f is a difference function.

* * * * *